(12) United States Patent
Mori et al.

(10) Patent No.: US 9,010,512 B2
(45) Date of Patent: Apr. 21, 2015

(54) DOG CLUTCH FOR AUTOMATED TRANSMISSION

(71) Applicant: Aisin Seiki Kabushiki Kaisha, Kariya-shi (JP)

(72) Inventors: Kyosuke Mori, Kariya (JP); Yasuhisa Iwasaki, Ichinomiya (JP); Shinya Harada, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 141 days.

(21) Appl. No.: 13/782,070

(22) Filed: Mar. 1, 2013

(65) Prior Publication Data

US 2013/0240318 A1 Sep. 19, 2013

(30) Foreign Application Priority Data

Mar. 14, 2012 (JP) .................................. 2012-057563
Dec. 26, 2012 (JP) .................................. 2012-283231

(51) Int. Cl.
*F16D 11/10* (2006.01)
*F16D 11/00* (2006.01)

(52) U.S. Cl.
CPC .......... *F16D 11/10* (2013.01); *F16D 2011/002* (2013.01); *F16D 2011/008* (2013.01)

(58) Field of Classification Search
CPC ............................................... F16D 2011/002
USPC ........... 192/69.9, 69.7, 69.83, 53.1, 53.5, 108
See application file for complete search history.

(56) References Cited

U.S. PATENT DOCUMENTS

2004/0104092 A1* 6/2004 Nakai ........................ 192/69.9
2006/0027434 A1* 2/2006 Capito ....................... 192/69.83
2013/0240317 A1* 9/2013 Mori et al. .................. 192/69.8

FOREIGN PATENT DOCUMENTS

| DE | 10 2005 027 772 A1 | 12/2006 |
| DE | 10 2010 005 316 A1 | 7/2011 |
| JP | 2002-139146 | 5/2002 |
| JP | 2009-29394 | 2/2009 |
| JP | 2010-96190 | 4/2010 |

OTHER PUBLICATIONS

Extended European Search Report issued Jun. 28, 2013, in European Patent Application No. 13158071.4.

(Continued)

*Primary Examiner* — Rodney H Bonck
(74) *Attorney, Agent, or Firm* — Oblon, McClelland, Maier & Neustadt, L.L.P.

(57) ABSTRACT

A dog clutch for an automated transmission includes a rotary shaft rotatably connecting to one of an input shaft and an output shaft of the automated transmission, a clutch ring rotatably supported by the rotary shaft and rotatably connecting to the other of the input shaft and the output shaft, a clutch hub fixed to the rotary shaft, a sleeve including first teeth and second teeth, an axial driving device moving the sleeve, and a dog clutch portion arranged at the clutch ring, the dog clutch portion including: clutch forward teeth each having an engagement portion contactable with each of the first teeth, and inclined surfaces extending from the engagement portion toward both sides in a circumferential direction and inclined toward a rear end position of the dog clutch portion; and a clutch rearward tooth portion engageable with the second teeth and including clutch rearward teeth.

4 Claims, 11 Drawing Sheets

(56) References Cited

OTHER PUBLICATIONS

U.S. Appl. No. 13/782,210, filed Mar. 1, 2013, Mori, et al.
U.S. Appl. No. 14/169,440, filed Jan. 31, 2014, Nakamura, et al.
U.S. Appl. No. 14/168,127, filed Jan. 30, 2014, Mori, et al.

* cited by examiner

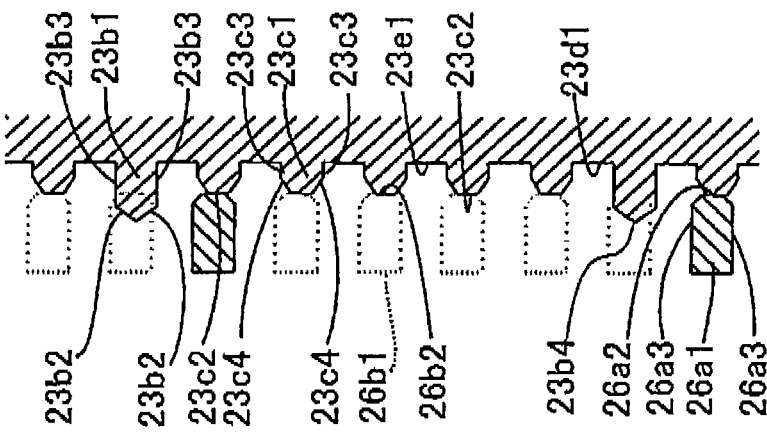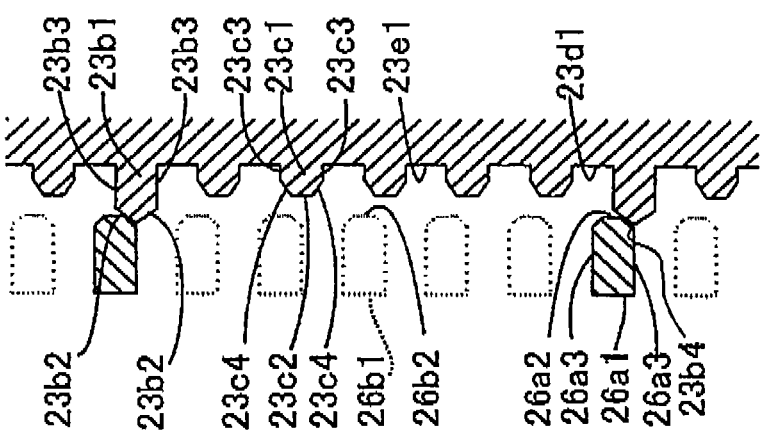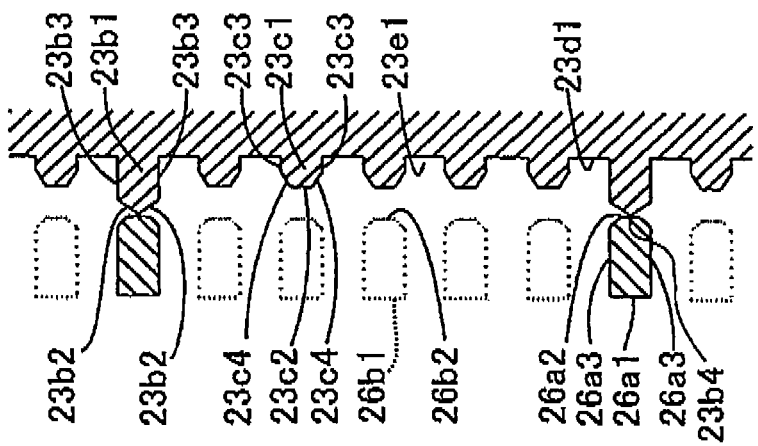

DOG CLUTCH FOR AUTOMATED TRANSMISSION

CROSS REFERENCE TO RELATED APPLICATIONS

This application is based on and claims priority under 35 U.S.C. §119 to Japanese Patent Applications 2012-057563, filed on Mar. 14, 2012, and 2012-283231, filed on Dec. 26, 2012, the entire contents of which are incorporated herein by reference.

TECHNICAL FIELD

This disclosure generally relates to a dog clutch for an automated transmission applied to a vehicle.

BACKGROUND DISCUSSION

A known dog clutch device disclosed in JP2010-96190A (which will be hereinafter referred to as Reference 1) includes a rotary shaft, a hub (clutch hub), a sleeve, and a clutch ring. The dog clutch device is configured as described below in order to achieve high engagement and in order to reduce gear backlash. The sleeve slidably engages with the clutch hub in an axial direction of the rotary shaft. A spline of the sleeve is engageable with a dog clutch portion of the clutch ring rotatably arranged relative to the clutch hub. The spline of the sleeve includes first and second teeth. A length (whole depth) of each of the first teeth in a radial direction of the sleeve is designed to be longer than (greater than) a length (whole depth) of each of the second teeth in the radial direction. The first and second teeth will be hereinafter referred to as high and short teeth. The dog clutch portion of the clutch ring includes forward and rearward teeth (clutch forward and rearward teeth). Each of the clutch forward teeth includes a length (whole depth) in a radial direction of the clutch ring so as to engage with the high tooth of the spline and so as not to engage with the short tooth of the spline. Each of the clutch rearward teeth is provided at a position retracted from the clutch forward tooth in the axial direction. The clutch rearward tooth includes a length (whole depth) in the radial direction of the clutch ring so as to engage with the short tooth of the spline. A large-depth tooth groove with which the high tooth is engageable is formed between the clutch forward tooth and the clutch rearward tooth.

According to the dog clutch device disclosed in Reference 1, for example, in a case where a rotational difference between the clutch ring and the sleeve that is engaged with the clutch hub is large, the high tooth of the sleeve is firstly pressed against a flat surface serving as a front end surface of the clutch forward tooth of the clutch ring, therefore generating a frictional force. Rotating speeds of the clutch ring and the sleeve are increased and decreased depending on the frictional force, therefore reducing the rotational difference between the clutch ring and the sleeve. Accordingly, the rate of reduction of the rotational difference is small. Consequently, it takes time to obtain a condition where the sleeve rotating at a different speed relative to the clutch ring is brought into synchronized rotation with the clutch ring so that the high tooth of the sleeve shifts to be inserted in the large-depth tooth groove formed between the forward and rearward teeth of the clutch ring. As a result, gear-shifting time based on an operation of the dog clutch device is elongated.

A need thus exists for a dog clutch for an automated transmission, which is not susceptible to the drawback mentioned above.

SUMMARY

According to an aspect of this disclosure, a dog clutch for an automated transmission includes a rotary shaft rotatably connecting to one of an input shaft and an output shaft of the automated transmission and provided rotatably about an axial line, a clutch ring rotatably supported by the rotary shaft and rotatably connecting to the other of the input shaft and the output shaft, a clutch hub fixed to the rotary shaft and arranged adjacent to the clutch ring, a sleeve slidably engaging with the clutch hub in a direction of the axial line, the sleeve including a spline, the spline including a plurality of first teeth and a plurality of second teeth, each of the first teeth including a whole depth which is greater than a whole depth of each of the second teeth, an axial driving device moving the sleeve in the direction of the axial line, and a dog clutch portion arranged at the clutch ring in a protruding manner toward the sleeve, the dog clutch portion selectively engaging and disengaging relative to the spline formed at the sleeve when the sleeve moves in the direction of the axial line, the dog clutch portion including clutch forward teeth each outer diameter of which is greater than an inner diameter of the first tooth and which is smaller than an inner diameter of the second tooth, the clutch forward teeth the number of which is equal to the number of first teeth, each of the clutch forward teeth being formed to extend from a front end surface of the dog clutch portion to a rear end position of the dog clutch portion in a state where the clutch forward tooth is provided at a position facing the first tooth, the clutch forward tooth including a front end portion which faces the first tooth and at which an engagement portion contactable with the first tooth is formed, and inclined surfaces which are formed to extend from the engagement portion toward both sides in a circumferential direction of the clutch ring and to be inclined toward the rear end position, a clutch rearward tooth portion engageable with the second teeth of the spline and including clutch rearward teeth and a small-depth tooth groove, the clutch rearward tooth portion being formed to extend from a position rearward from the front end surface by a first predetermined distance to the rear end position, a large-depth tooth groove which is formed between the clutch forward tooth and one of the clutch rearward teeth adjacent to the clutch forward tooth and with which the first tooth is engageable, and a contact surface which is formed at a radially inward side from a bottom surface of the small-depth tooth groove and with which the first tooth is contactable.

BRIEF DESCRIPTION OF THE DRAWINGS

The foregoing and additional features and characteristics of this disclosure will become more apparent from the following detailed description considered with the reference to the accompanying drawings, wherein:

FIG. 10A is a view illustrating the operation of the dog clutch shown in FIG. 3, seen from a radially outward side;

FIG. 10B is a view illustrating the operation of the dog clutch shown in FIG. 3, seen from the radially outward side;

FIG. 10C is a view illustrating the operation of the dog clutch shown in FIG. 3, seen from the radially outward side;

DETAILED DESCRIPTION

A first embodiment of a dog clutch for an automated transmission mounted to a vehicle will be explained with reference to the attached drawings.

Figure 1:
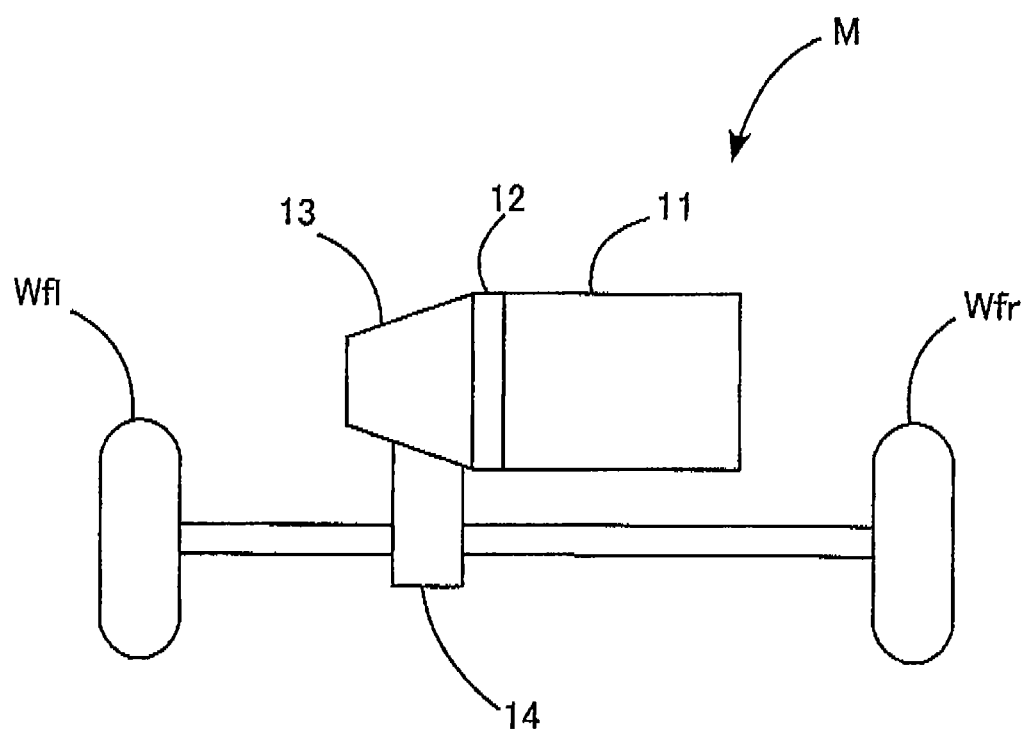
FIG. 1 is a schematic view illustrating a configuration of a vehicle to which a dog clutch according to a first embodiment disclosed here is applied.

As illustrated in FIG. 1, a vehicle M includes an engine 11, a clutch 12, an automated transmission (e.g. automated manual transmission) 13, a differential gear device 14, and driving wheels, specifically, front-left and front-right driving wheels Wfl and Wfr. The engine 11 generates a driving force by combustion of fuel. The engine 11 is configured to transmit the driving force to the front-left and front-right driving wheels Wfl and Wlr via the clutch 12, the automated transmission 13, and the differential gear device 14. That is, the vehicle M is a front-wheel-drive vehicle.

The clutch 12 is configured to be automatically connected or disconnected on the basis of a command from a control device. The automated transmission 13 includes a dog clutch mechanism for automatically selecting, for example, five forward speeds and one reverse speed. The differential gear device 14 that includes both a final gear and a differential gear is integrally formed with the automated transmission 13.

Figure 2:
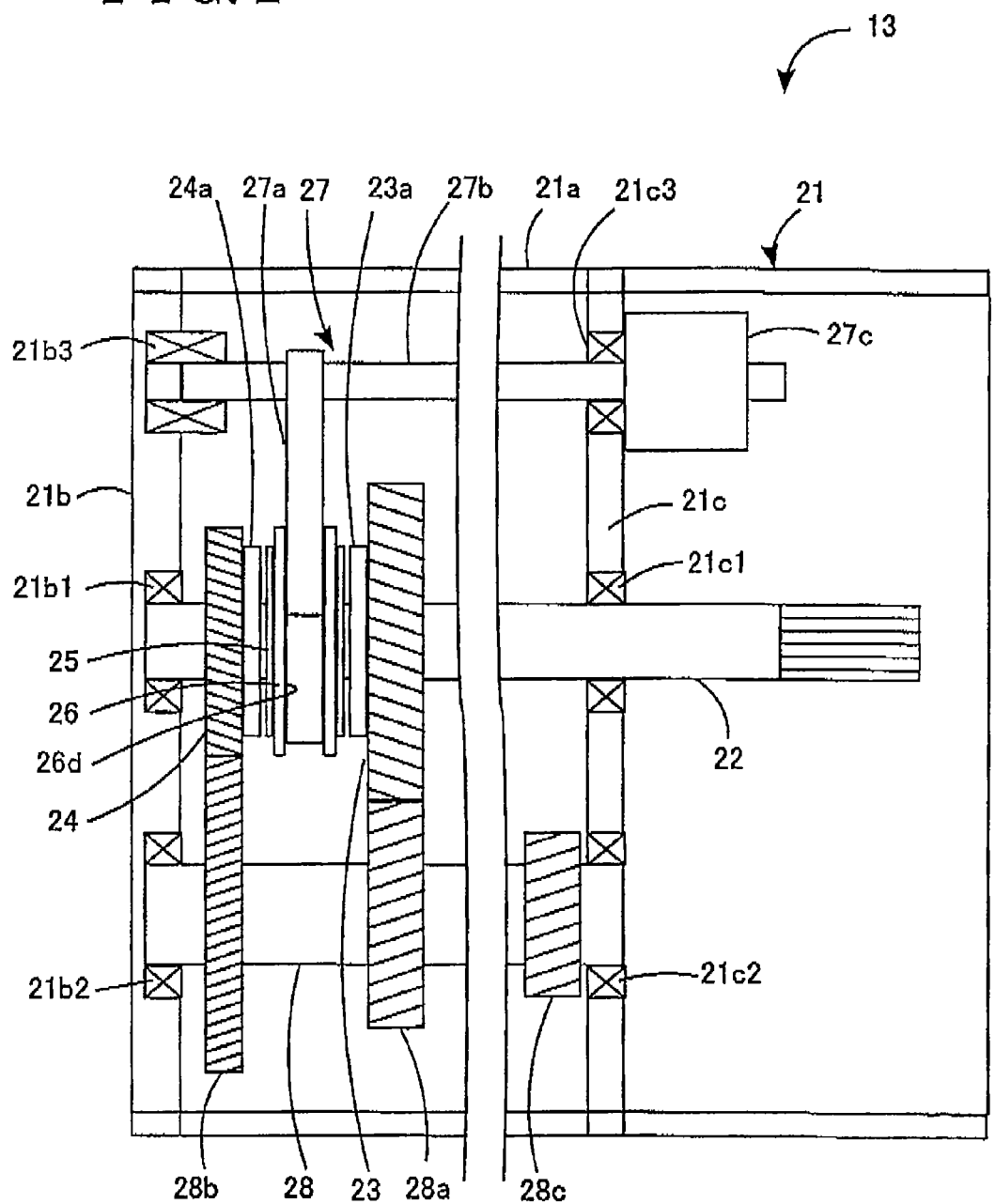
FIG. 2 is a schematic explanatory view illustrating an automated transmission to which the dog clutch according to the first embodiment disclosed here is applied.

As illustrated in FIG. 2, the automated transmission 13 includes a casing 21, an input shaft 22, a first clutch ring 23 (i.e., a clutch ring), a second clutch ring 24 (i.e., a clutch ring), a clutch hub 25, a sleeve 26, an axial driving mechanism 27 serving as an axial driving device, and an output shaft 28.

The casing 21 includes a body portion 21a formed into a substantially cylindrical form including a bottom, a first wall 21b serving as a bottom wall of the body portion 21a, and a second wall 21c dividing an inside of the body portion 21a in a horizontal direction in FIG. 2.

The input shaft 22 is rotatably supported by the casing 21. Specifically, a first end (a left end in FIG. 2) of the input shaft 22 is rotatably supported by the first wall 21b via a bearing 21b1 while a second end (a right end in FIG. 2) of the input shaft 22 is rotatably supported by the second wall 21c via a bearing 21c1. The second end of the input shaft 22 is rotatably connected to an output shaft of the engine 11 via the clutch 12. Accordingly, an output of the engine 11 is input to the input shaft 22 in a state where the clutch 12 is in a connected state. The input shaft 22 serves as a rotary shaft according to the first embodiment.

The first clutch ring 23 and the second clutch ring 24 are rotatably supported by the input shaft 22. In addition, the clutch hub 25 is fixed to the input shaft 22 by spline-fitting, for example, in a state to be arranged adjacent to the first clutch ring 23 and the second clutch ring 24 therebetween.

Figure 3:
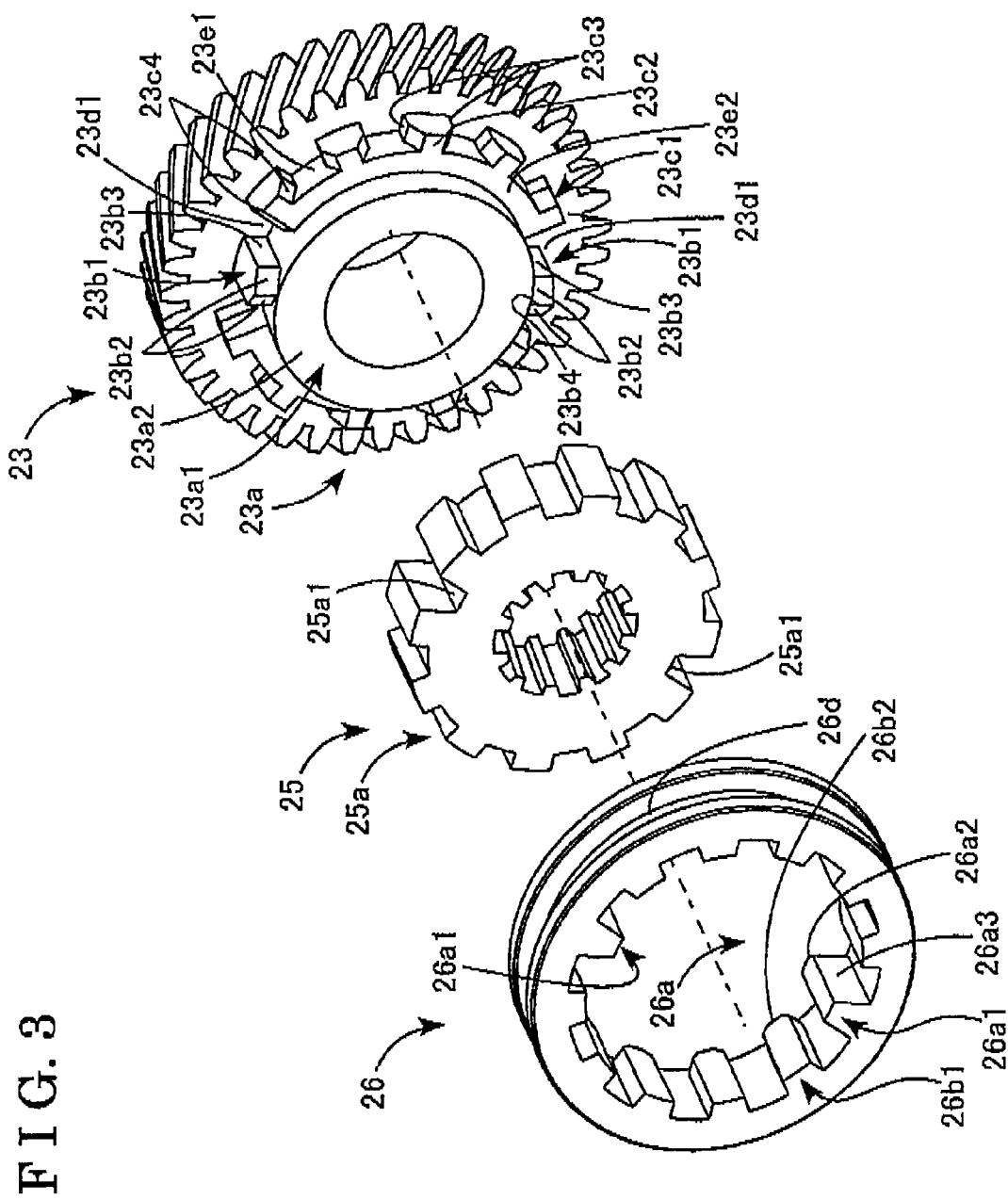
FIG. 3 is an exploded perspective view of the dog clutch for the automated transmission according to the first embodiment.

As illustrated in FIG. 3, a first dog clutch portion 23a (i.e., a dog clutch portion) is formed at a side surface of the first clutch ring 23 so as to face the clutch hub 25. The first dog clutch portion 23a engages with a spline 26a formed at the sleeve 26. In addition, a second dog clutch portion 24a (i.e., a dog clutch portion) is formed at a side surface of the second clutch ring 24 so as to face the clutch hub 25. The second dog clutch portion 24a engages with the spline 26a of the sleeve 26. The first dog clutch portion 23a of the first clutch ring 23 and the second dog clutch portion 24a of the second clutch ring 24 have substantially the same configurations. Thus, details of the first clutch ring 23, the clutch hub 25, and the sleeve 26 will be explained below with reference to FIG. 3.

Figure 4B:
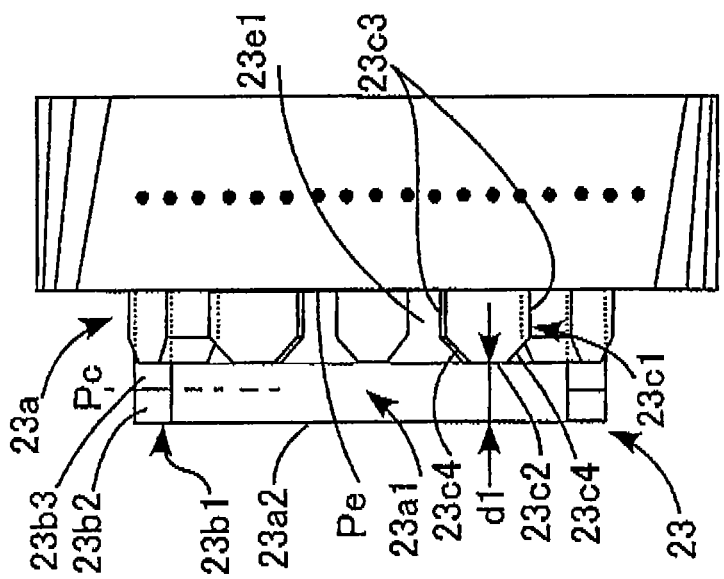
FIG. 4B is a side view of the first clutch ring of the dog clutch according to the first embodiment.
Figure 4A:
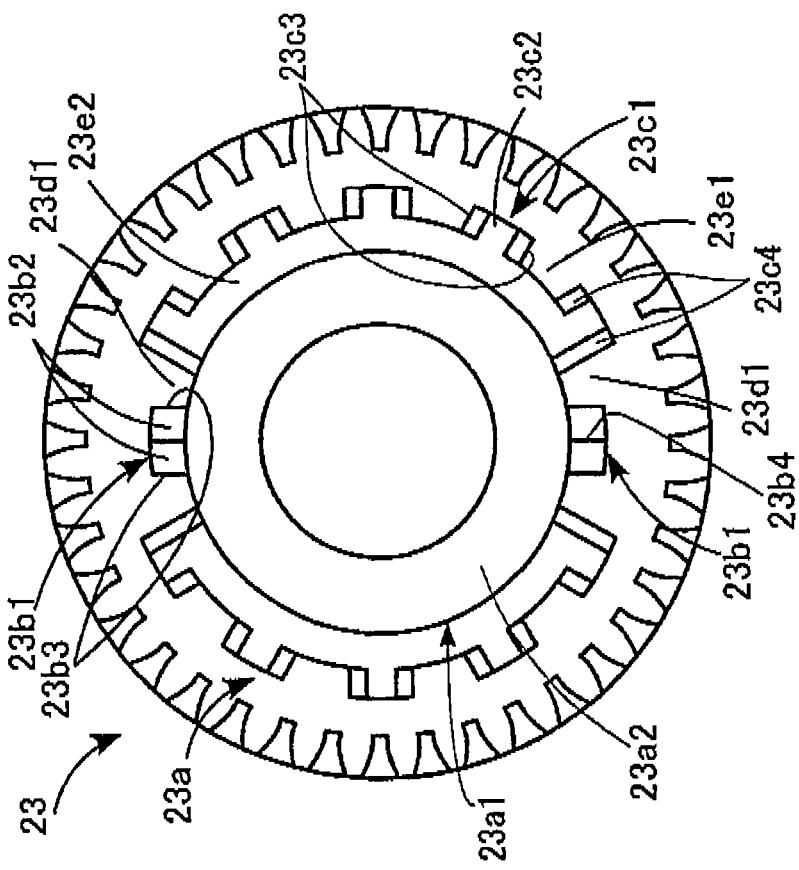
FIG. 4A is a front view of a first clutch ring of the dog clutch according to the first embodiment.

As illustrated in FIGS. 3 and 4, the first dog clutch portion 23a includes a convex portion 23a1 formed in a ring form, two clutch forward teeth 23b1, and ten clutch rearward teeth 23c1. The two clutch forward teeth 23b1 are arranged at an outer periphery of the convex portion 23a1 at a 180 degree interval. Five of the ten clutch rearward teeth 23c1 are arranged at a first half of the outer periphery of the convex portion 23a1 at equal intervals between the two clutch forward teeth 23b1 while another five of the ten clutch rearward teeth 23c1 are arranged at a second half of the outer periphery of the convex portion 23a1 at equal intervals between the two clutch forward teeth 23b1.

An outer diameter of the convex portion 23a1 is designed to be smaller than an inner diameter of each of high teeth 26a1 (serving as first teeth) of the spline 26a formed at the sleeve 26. An outer diameter of the clutch forward tooth 23b1 is designed to be greater than the inner diameter of the high tooth 26a1 of the sleeve 26 and to be smaller than an inner diameter of each of short teeth 26b1 (serving as second teeth) of the spline 26a formed at the sleeve 26.

A large-depth tooth groove 23d1 with which the high tooth 26a1 of the spline 26a is engageable is formed between the clutch forward tooth 23b1 and one of the clutch rearward teeth 23c1, which is arranged adjacent to the clutch forward tooth 23b1. A small-depth tooth groove 23e1 with which the short tooth 26b1 of the spline 26a is engageable is formed between the clutch rearward teeth 23c1 adjacent to each other. In particular, the clutch forward tooth 23b1 is configured so as not to engage with the short tooth 26b1 and so as to engage with the high tooth 26a1 in the large-depth tooth groove 23d1. The clutch rearward tooth 23c1 is configured so as to engage with the high tooth 26a1 in the large-depth tooth groove 23d1 and with the short tooth 26b1 in the small-depth tooth groove 23e1.

The same number of clutch forward teeth 23b1 (the two clutch forward teeth 23b1 in the first embodiment) as the number of high teeth 26a1 (the two high teeth 26a1) is formed at the first clutch ring 23. The number of clutch forward teeth 23b1 is set to be small so that the two high teeth 26a1 may easily shift to be inserted between the two clutch forward teeth 23b1 even in a case where a rotational difference between the sleeve 26 and the first clutch ring 23 is large. Each of the clutch forward teeth 23b1 is formed so as to extend from a front end surface 23a2 of the convex portion 23a1 to a rear end position Pe of the first dog clutch portion 23a in a state where the clutch forward tooth 23b1 is provided at a position facing the high tooth 26a1.

The clutch rearward tooth 23c1 and the small-depth tooth groove 23e1 that configure a clutch rearward tooth portion are formed so as to extend from a position rearward from the front end surface 23a2 of the convex portion 23a1 by a first predetermined distance d1 to the rear end position Pe of the first dog clutch portion 23a. A contact surface 23e2 with which the high tooth 26a1 is contactable is formed at an inward side from a bottom surface of the small-depth tooth groove 23e1 in a radial direction of the first clutch ring 23.

The clutch forward tooth 23b1 includes a front end portion facing the high tooth 26a1. An engagement portion 23b4 and inclined surfaces 23b2 are formed at the front end portion of the clutch forward tooth 23b1. The engagement portion 23b4 is contactable with the high tooth 26a1. The inclined surfaces 23b2 are formed so as to extend from an intermediate portion of the engagement portion 23b4 to both side in a circumferential direction of the first clutch ring 23 and so as to be inclined toward the rear end position Pe of the first dog clutch portion 23a. An engagement surface 23c2 contactable with the high tooth 26a1 and the short tooth 26b1 is formed at the clutch rearward tooth 23c1.

The clutch forward tooth 23b1 includes inclined surfaces 23b2 each intersecting at a position Pc with each of the side surfaces 23b3. The inclined surface 23b2 is formed so that the position Pc is closer to the front end surface 23a2 of the convex portion 23a1 than the contact surface 23e2. In addition, the intermediate portion of the engagement portion 23b4 located at an edge of the front end portion of the clutch forward tooth 23b1, i.e., an intersection portion at which the inclined surfaces 23b2 intersect with each other, is chamfered to form a round shape.

Figure 7A:
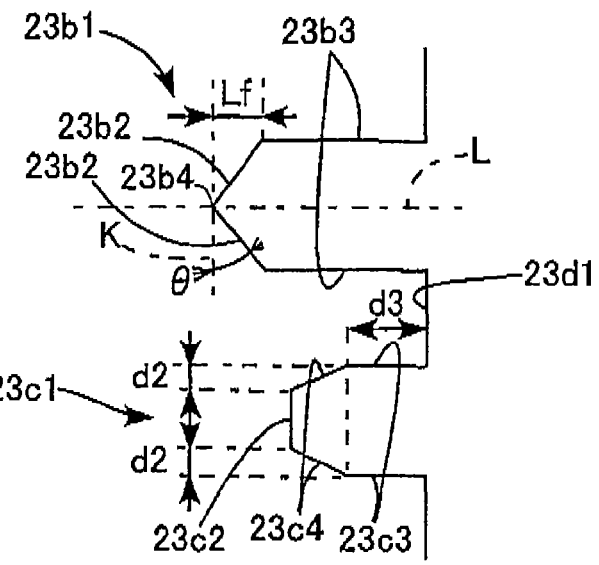
FIG. 7A is an explanatory view illustrating an example of profiles and positions of clutch forward and rearward teeth shown in FIG. 3.

Here, the inclined surface 23b2 of the clutch forward tooth 23b1 may be formed in two types of shapes (first and second shapes) and the first and second shapes are selectable depending on performance of the automated transmission 13. As illustrated in FIG. 7A, the inclined surface 23b2 is configured so that a length Lf thereof in an axial direction L of the clutch forward tooth 23b1 is as short as possible and so that a linear portion of the side surface 23b3 may be secured. Thus, the inclined surface 23b2 is formed in the first shape.

Therefore, an inclined angle θ formed by the inclined surface 23b2 and a line K perpendicular to the axial direction L is small. Consequently, a front end surface 26a2 (a chamfered portion) of the high tooth 26a1 is smoothly contactable with the inclined surface 23b2 of the clutch forward tooth 23b1; thereby, increase and decrease of a rotating speed of the sleeve 26 may be easily adjusted. In addition, each of side surfaces 26a3 of the high tooth 26a1 is contactable with a large area of the side surface 23b3 of the clutch forward tooth 23b1; thereby, the rotating speed of the sleeve 26 may be promptly increased and decreased.

Figure 7B:
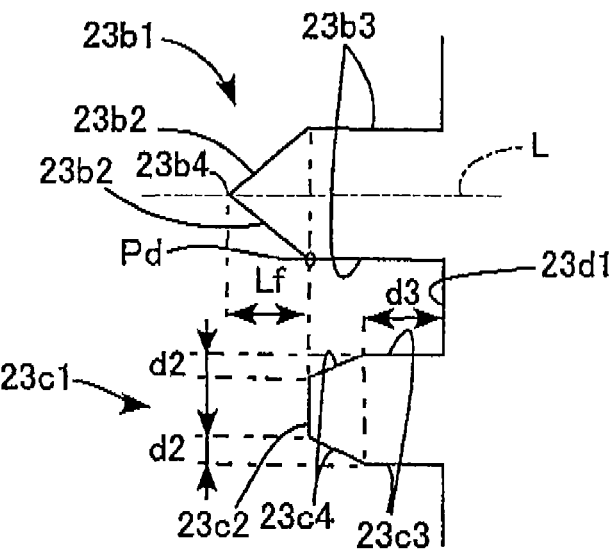
FIG. 7B is an explanatory view illustrating another example of the profiles and positions of the clutch forward and rearward teeth shown in FIG. 3.

As illustrated in FIG. 7B, the inclined surface 23b2 of the clutch forward tooth 23b1 is formed in the second shape as follows. A position Pd at which the inclined surface 23b2 intersects with the side surface 23b3 is provided to be identical to a position of the contact surface 23e2 in the axial direction L (the position of the contact surface 23e2 in the axial direction L is identical to a position of the engagement surface 23c2 of the clutch rearward tooth 23c1 in the axial direction L). Therefore, a length of the inclined surface 23b2 is designed to be long compared to a length of the inclined surface 23b2 of the clutch forward tooth 23b1 shown in FIG. 7A. Accordingly, the front end surface 26a2 (the chamfered portion) of the high tooth 26a1 is contactable with the inclined surface 23b2 of the clutch forward tooth 23b1 for a long time compared to a case where the front end surface 26a2 makes contact with the inclined surface 23b2 of the clutch forward tooth 23b1 shown in FIG. 7A. Consequently, the rotating speed of the sleeve 26 may be easily increased and decreased.

The engagement surface 23c2 is formed at the clutch rearward tooth 23c1 so as to extend between positions inward from each of side surfaces 23c3 in the circumferential direction by a second predetermined distance d2. In addition, each of side inclined surfaces 23c4 formed at the side surfaces 23c3 extends from each of side ends of the engagement surface 23c2 in the circumferential direction to a position forward from the rear end position Pe of the first dog clutch portion 23a by a third predetermined distance d3 in the axial direction L.

Figure 8:
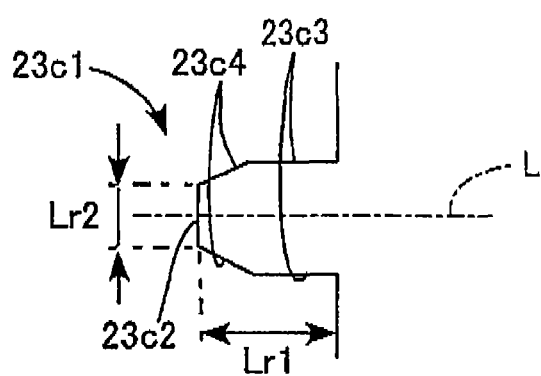
FIG. 8 is an explanatory view illustrating the profile of the clutch rearward tooth shown in FIG. 7.

Here, the side inclined surface 23c4 of the clutch rearward tooth 23c1 is formed as follows. As illustrated in FIG. 8, a distance Lr1 of the clutch rearward tooth 23c1 in the axial direction L is determined so that a linear portion of the side surface 23c3 remains adequately for transmitting a sufficient torque after the high tooth 26a1 and the short tooth 26b1 are engaged with the clutch rearward teeth 23c1.

Further, a length Lr2 of the engagement surface 23c2 of the clutch rearward tooth 23c1 is determined so that the engagement surface 23c2 may sufficiently generate a frictional force when the front end surface 26a2 of the high tooth 26a1 and a front end surface 26b2 of the short tooth 26b1 are brought into contact with the corresponding engagement surfaces 23c2 of the clutch rearward teeth 23c1. For example, the length Lr2 of the engagement surface 23c2 may be formed to be a half of a width of the clutch rearward tooth 23c1 in the circumferential direction.

A gear (helical gear) engageable with a first output gear 28a which will be described below is formed at an outer circumferential surface of the first clutch ring 23. A gear (helical gear) engageable with a second output gear 28b which will be described below is formed at an outer circumferential surface of the second clutch ring 24.

Figure 5:
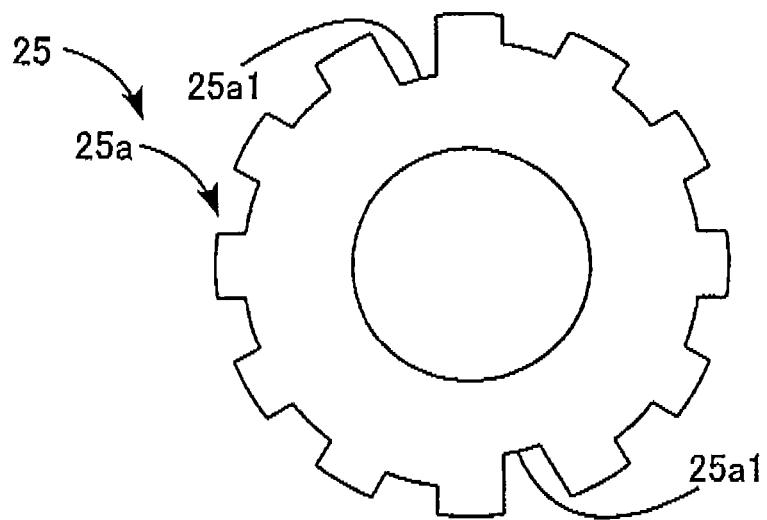
FIG. 5 is a front view of a clutch hub illustrated in FIG. 3.

As illustrated in FIGS. 3 and 5, a spline 25a is formed at an outer circumferential surface of the clutch hub 25. The spline 25a engages with the spline 26a formed at an inner circumferential surface of the sleeve 26, in a slidable manner along a direction of an axial line of the input shaft 22 (along an axial direction of the input shaft 22). The spline 25a includes multiple (for example, two) grooves 25a1, each depth of which is greater than a depth of each of other multiple grooves of the spline 25a. The groove 25a1 is configured to conform to a tooth profile of each of the multiple high teeth 26a1.

Figure 6:
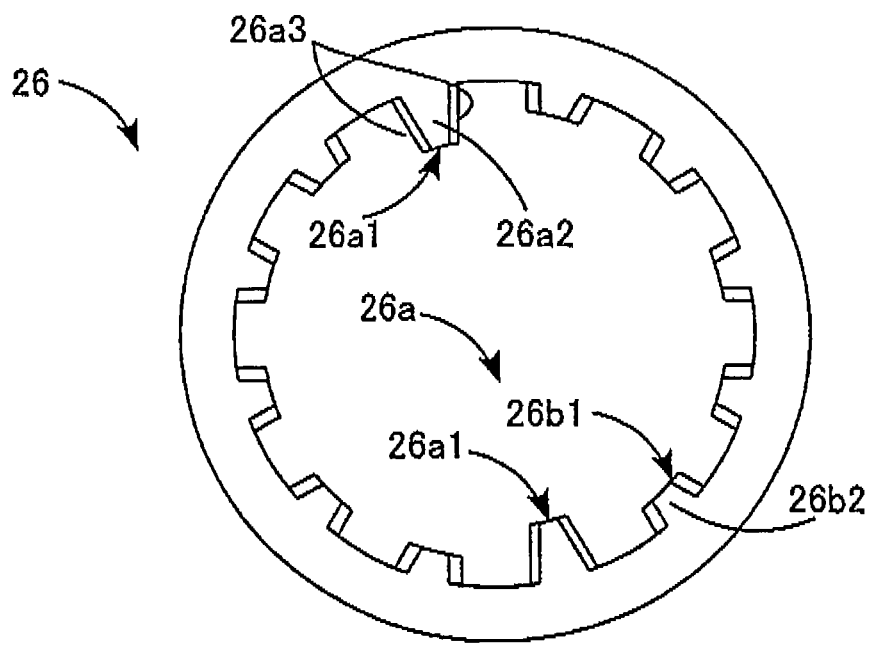
FIG. 6 is a front view of a sleeve illustrated in FIG. 3.

As illustrated in FIGS. 3 and 6, the sleeve 26 formed in a ring shape integrally rotates with the clutch hub 25. The sleeve 26 is slidable relative to the clutch hub 25 in the axial direction. The spline 26a is formed at the inner circumferential surface of the sleeve 26 so as to engage with the spline 25*a* formed at the outer circumferential surface of the clutch hub 25.

The spline 26*a* is configured by the plural high teeth 26*a*1 (for example, the two high teeth 26*a*1) and the short teeth 26*b*1. Each of the high teeth 26*a*1 is formed so that a length (whole depth) thereof in a radial direction of the sleeve 26 is longer (greater) than a length (whole depth) of each of the short teeth 26*b*1 in the radial direction. Corners of side ends of the front end surface 26*a*2 of the high tooth 26*a*1 in a circumferential direction of the sleeve 26 and corners of side ends of the front end surface 26*b*2 of the short tooth 26*b*1 in the circumferential direction are chamfered at 45 degrees angle so as not to be damaged when the high tooth 26*a*1 and the short tooth 26*b*1 are brought in contact with the clutch forward tooth 23*b*1 or the clutch rearward tooth 23*c*1. In addition, an outer circumferential groove 26*d* is formed at an outer circumferential surface of the sleeve 26 along the circumferential direction. A first end portion of a fork 27*a* is slidably engaged with the outer circumferential groove 26*d* along the circumferential direction.

As illustrated in FIG. 2, the axial driving mechanism 27 serves to reciprocate the sleeve 26 in the axial direction. For example, a reaction force acts on the sleeve 26 from the first clutch ring 23 or the second clutch ring 24 in a state where the sleeve 26 is pressed by the axial driving mechanism 27 to the first clutch ring 23 or the second clutch ring 24. In such case, the axial driving mechanism 27 is configured to allow the sleeve 26 to reciprocate in the axial direction by the reaction force.

The axial driving mechanism 27 includes the fork 27*a*, a fork shaft 27*b*, and a drive device (an actuator) 27*c*. The first end portion of the fork 27*a* is formed so as to conform to an outer circumferential shape of the outer circumferential groove 26*d*. A second end portion of the fork 27*a* is fixed to the fork shaft 27*b*. The fork shaft 27*b* is supported by the casing 21 so as to slide along the axial direction. In particular, a first end (left end in FIG. 2) of the fork shaft 27*b* is supported via a bearing 21*b*3 by the first wall 21*b* and a second end (right end in FIG. 2) of the fork shaft 27*b* is supported via a bearing 21*c*3 by the second wall 21*c*. The second end of the fork shaft 27*b* is provided to penetrate through the drive device 27*c*.

The drive device 27*c* is a linear drive device driven by a linear motor. A known linear motor may be applied to the drive device 27*c*. In particular, plural coils are arranged side by side along the axial direction to form a core including a circular cylindrical shape. In addition, plural north pole magnets and plural south pole magnets are arranged side by side in an alternate manner on the fork shaft 27*b* penetrating through a through-hole of the core. Thus, the drive device 27*c* is configured. Energization to the respective coils is controlled; thereby, the fork shaft 27*b* may reciprocate in the axial direction and may be positioned and fixed in a predetermined position.

In addition, according to the first embodiment, the linear drive device is applied as the drive device 27*c*. Alternatively, a solenoid drive device or a hydraulic drive device that is a different drive device from the linear drive device may be applied as the drive device 27*c* as long as the different drive device is configured to reciprocate the sleeve 26 by the reaction force applied from the first clutch ring 23 or the second clutch ring 24 in a state where the sleeve 26 is pressed to the first clutch ring 23 or the second clutch ring 24.

The output shaft 28 corresponding to a counter shaft is rotatably supported by the casing 21. In particular, a first end (left end in FIG. 2) of the output shaft 28 is supported via a bearing 21*b*2 by the first wall 21*b* and a second end (right end in FIG. 2) of the output shaft 28 is supported by a bearing 21*c*2 by the second wall 21*c*. The first output gear 28*a*, the second output gear 28*b*, and a third output gear 28*c* are fixed to the output shaft 28, for example, by spline-fitting.

The first output gear 28*a* engages with the first clutch ring 23. A gear (helical gear) engageable with the first clutch ring 23 is formed at an outer circumferential surface of the first output gear 28*a*. The second output gear 28*b* engages with the second clutch ring 24. A gear (helical gear) engageable with the second clutch ring 24 is formed at an outer circumferential surface of the second output gear 28*b*. The third output gear 28*c* engages with a clutch ring of the differential gear device 14. A gear (helical gear) engageable with the clutch ring is formed at an outer circumferential surface of the third output gear 28*c*.

The driving force inputted from the engine via the input shaft 22 is transmitted to the output shaft 28 and is finally outputted via the third output gear 28*c* to the differential gear device 14. In addition, the output shaft 28 according to the first embodiment may be provided at an input side of the automated transmission 13 while the input shaft 22 according to the first embodiment may be provided at an output side of the automated transmission 13.

Next, operation of the high tooth 26*a*1 and the short tooth 26*b*1 of the sleeve 26 and operation of the clutch forward tooth 23*b*1 and the clutch rearward tooth 23*c*1 of the first clutch ring 23 in the dog clutch according to the first embodiment will be described as follows with reference to FIGS. 9A to 9D, FIGS. 10A to 10E, and FIGS. 11A to 11D. Here, as in a shift-up operation, in a case where the sleeve 26 rotates at high speed and with small inertia moment and the first clutch ring 23 rotates at low speed and with large inertia moment, the rotating speed of the sleeve 26 is reduced. On the other hand, as in a shift-down operation, in a case where the sleeve 26 rotates at low speed and with small inertia moment and the first clutch ring 23 rotates at high speed and with large inertia moment, the rotating speed of the sleeve 26 is increased. Reduction of the rotating speed of the sleeve 26 will be described as follows.

Figure 9A:
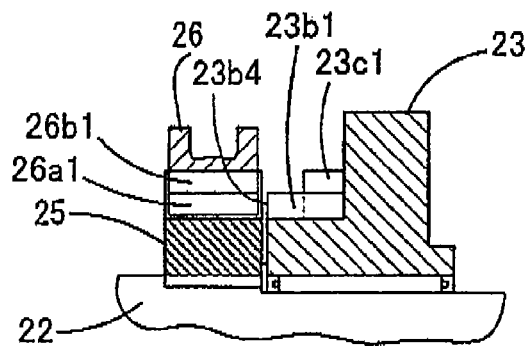
FIG. 9A is a cross sectional view illustrating an assembled state and an operation of the dog clutch shown in FIG. 3.
Figure 9B:
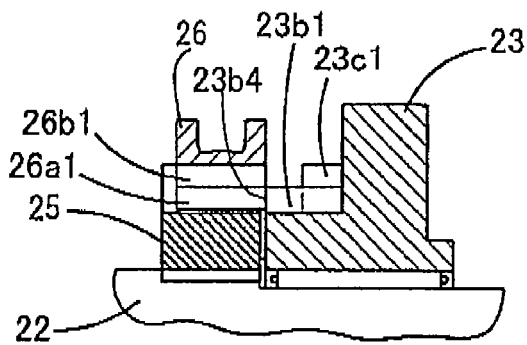
FIG. 9B is a cross sectional view illustrating the assembled state and the operation of the dog clutch shown in FIG. 3.

As illustrated in FIG. 9A, the sleeve 26 is located away from the first clutch ring 23 in a state before a shifting operation of the automated transmission 13 is performed. Then, in accordance with the shifting operation, the sleeve 26 is shifted by the axial driving mechanism 27 toward the first clutch ring 23 along the axial direction. Therefore, as illustrated in FIGS. 9B and 10A, the front end surface 26*a*2 of each of the high teeth 26*a*1 is brought into contact with the intersection portion of the inclined surfaces 23*b*2, i.e., with the engagement portion 23*b*4 at the front end portion of the clutch forward tooth 23*b*1. At this time, each of the short teeth 26*b*1 is not in contact with any of the clutch forward tooth 23*b*1 and the clutch rearward tooth 23*c*1. As a result, the rotating speed of the sleeve 26 is slightly reduced by the aforementioned contact of the front end surface 26*a*2 of the high tooth 26*a*1 with the engagement portion 23*b*4 of the clutch forward tooth 23*b*1.

Then, the sleeve 26 is further shifted by the axial driving mechanism 27 along the axial direction. Therefore, as illustrated in FIG. 10B, the front end surface 26*a*2 (the chamfered portion) of the high tooth 26*a*1 is brought into contact with the inclined surface 23*b*2 of the clutch forward tooth 23*b*1. At this time, the short tooth 26*b*1 is not in contact with any of the clutch forward tooth 23*b*1 and the clutch rearward tooth 23*c*1. As a result, the rotating speed of the sleeve 26 is significantly reduced by the aforementioned contact of the front end surface 26*a*2 of the high tooth 26*a*1 with the inclined surface 23*b*2 of the clutch forward tooth 23*b*1.

Figure 9C:
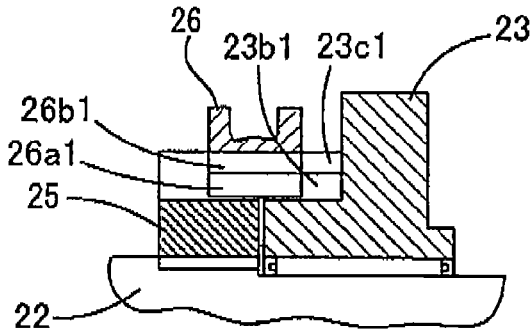
FIG. 9C is a cross sectional view illustrating the assembled state and the operation of the dog clutch shown in FIG. 3.

Afterward, the sleeve 26 is furthermore shifted by the axial driving mechanism 27 along the axial direction. Therefore, as illustrated in FIGS. 9C and 10C, the front end surface 26a2 of the high tooth 26a1 and the front end surface 26b2 (a chamfered portion) of the short tooth 26b1 are brought into contact with the corresponding engagement surfaces 23c2 of the clutch rearward teeth 23c1; thereby, the reduction of the rotating speed of the sleeve 26 is adjusted.

Figure 10D:
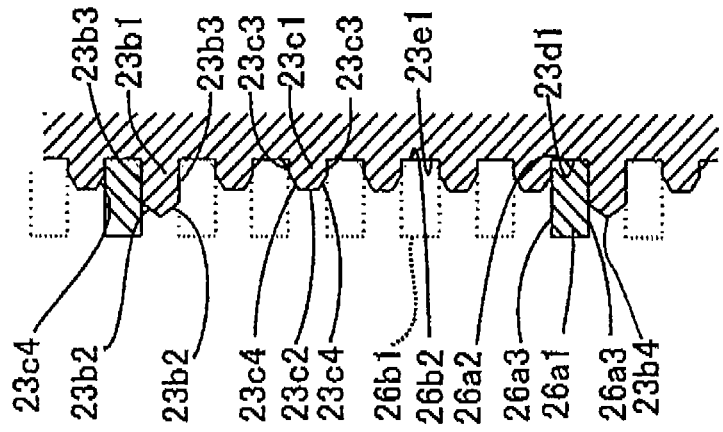
FIG. 10D is a view illustrating the operation of the dog clutch shown in FIG. 3, seen from the radially outward side.

Then, the sleeve 26 is further shifted by the axial driving mechanism 27 along the axial direction. Therefore, an operating condition of the high tooth 26a1, the short tooth 26b1, the clutch forward tooth 23b1, and the clutch rearward tooth 23c1 is sorted in two conditions (first and second operating conditions). In the first operating condition as illustrated in FIG. 10D, the front end surface 26a2 (the chamfered portion) of the high tooth 26a1 is brought in contact with the side inclined surface 23c4 of the clutch rearward tooth 23c1; thereby, the high tooth 26a1 is guided toward the large-depth tooth groove 23d1 and thus may shift to be inserted in the large-depth tooth groove 23d1.

Figure 9D:
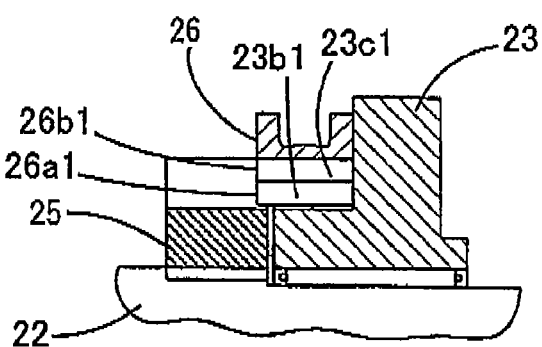
FIG. 9D is a cross sectional view illustrating the assembled state and the operation of the dog clutch shown in FIG. 3.
Figure 10E:
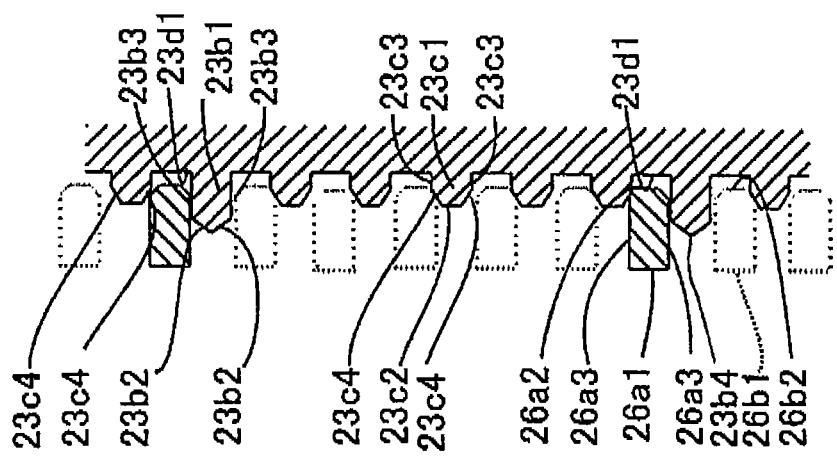
FIG. 10E is a view illustrating the operation of the dog clutch shown in FIG. 3, seen from the radially outward side.

Along with shifting of the high tooth 26a1 into the large-depth tooth groove 23d1 by the side inclined surface 23c4 of the clutch rearward tooth 23c1, the short tooth 26b1 is brought in contact with the side inclined surfaces 23c4 of the clutch rearward tooth 23c1. Therefore, the short tooth 26b1 is guided toward the small-depth tooth groove 23e1 and thus may shift to be inserted in the small-depth tooth groove 23e1. As a result, the rotating speed of the sleeve 26 is significantly reduced. Then, the sleeve 26 is furthermore shifted by the axial driving mechanism 27 along the axial direction. Therefore, as illustrated in FIGS. 9D and 10E, the high tooth 26a1 fully engaged with the clutch forward tooth 23b1 and the clutch rearward tooth 23c1 via the large-depth tooth groove 23d1 and the short tooth 26b1 is fully engaged with the clutch rearward tooth 23c1 via the small-depth tooth groove 23e1. Consequently, the sleeve 26 rotates in synchronization with the first clutch ring 23 and thus the shifting operation is completed.

Figure 11A:
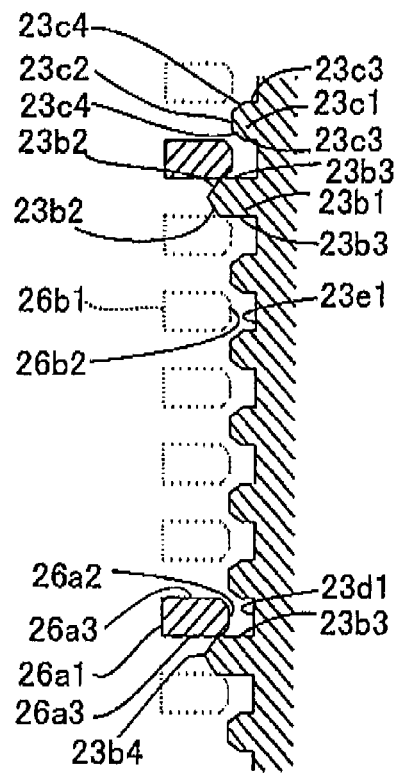
FIG. 11A is a view illustrating the operation of the dog clutch shown in FIG. 3, seen from the radially outward side.

In the second operating condition as illustrated in FIG. 11A, the side surface 26a3 of the high tooth 26a1 is brought in contact with the side surface 23b3 of the clutch forward tooth 23b1. In such case, the short tooth 26b1 is not in contact with any of the clutch forward tooth 23b1 and the clutch rearward tooth 23c1. As a result, the rotating speed of the sleeve 26 is significantly reduced by the aforementioned contact of the side surface 26a3 of the high tooth 26a1 with the side surface 23b3 of the clutch forward tooth 23b1.

Figure 11B:
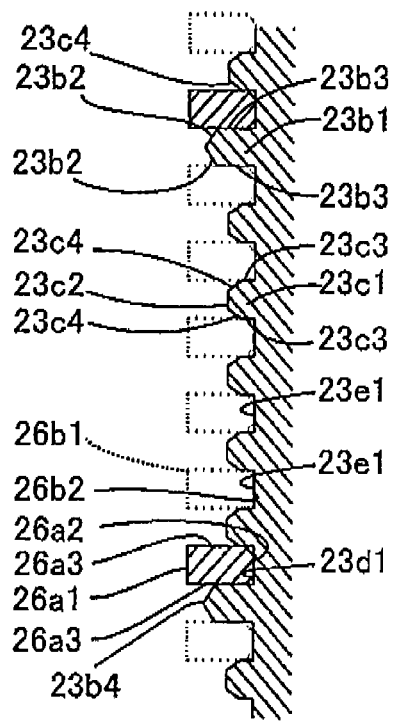
FIG. 11B is a view illustrating the operation of the dog clutch shown in FIG. 3, seen from the radially outward side.

Then, the sleeve 26 is further shifted by the axial driving mechanism 27 along the axial direction. Therefore, as illustrated in FIGS. 9D and 11B, the front end surface 26a2 (the chamfered portion) of the high tooth 26a1 is brought in contact with the side inclined surface 23c4 of the clutch rearward tooth 23c1 and is thereafter guided toward the large-depth tooth groove 23d1. Consequently, the high tooth 26a1 shifts to be inserted in the large-depth tooth groove 23d1. Along with shifting of the high tooth 26a1 into the large-depth tooth groove 23d1 by the side inclined surface 23c4 of the clutch rearward tooth 23c1, the short tooth 26b1 is guided toward the small-depth tooth groove 23e1 and therefore shift to be inserted in the small-depth tooth groove 23e1. Therefore, the high tooth 26a1 is fully engaged with the clutch forward tooth 23b1 and the clutch rearward tooth 23c1 and the short tooth 26b1 is fully engaged with the clutch rearward tooth 23c1. Consequently, the sleeve 26 rotates in synchronization with the first clutch ring 23 and thus the shifting operation is completed.

Figure 11C:
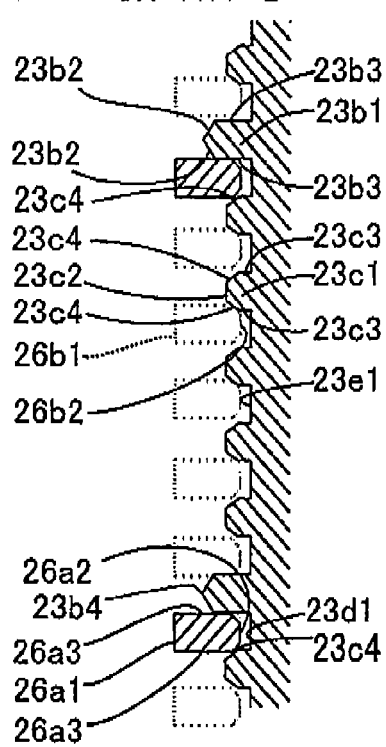
FIG. 11C is a view illustrating the operation of the dog clutch shown in FIG. 3, seen from the radially outward side.

In addition, for example, the rotating speed of the sleeve 26 is excessively reduced when the side surface 26a3 of the high tooth 26a1 is brought in contact with the side surface 23b3 of the clutch forward tooth 23b1 as illustrated in FIG. 11A. In such case, the front end surface 26a2 (the chamfered portion) of the high tooth 26a1 is brought in contact with the side inclined surface 23c4 of the clutch rearward tooth 23c1 as illustrated in FIG. 11C.

Figure 11D:
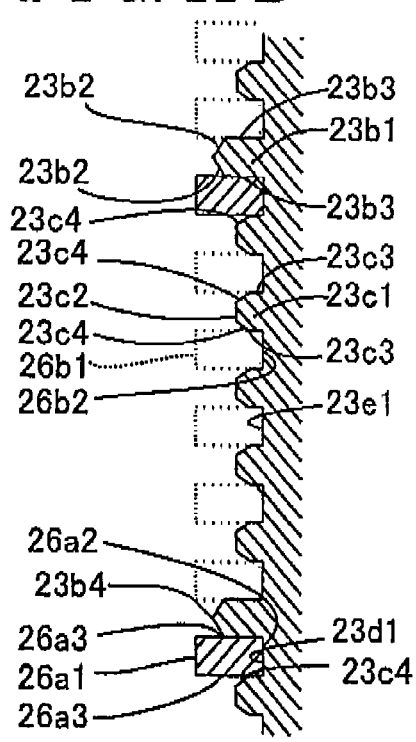
FIG. 11D is a view illustrating the operation of the dog clutch shown in FIG. 3, seen from the radially outward side.

As a result, the high tooth 26a1 is guided toward the large-depth tooth groove 23d1 by the aforementioned contact of the front end surface 26a2 with the side inclined surface 23c4 and thus may shift to be inserted into the large-depth tooth groove 23d1. Along shifting of the high tooth 26a1 into the large-depth tooth groove 23d1 by the side inclined surface 23c4, the short tooth 26b1 is guided toward the small-depth tooth groove 23e1 and thus may shift to be inserted in the small-depth tooth groove 23e1. Afterward, the sleeve 26 is further shifted by the axial driving mechanism 27 along the axial direction. Therefore, as illustrated in FIG. 11D, the high tooth 26a1 is fully engaged with the clutch forward tooth 23b1 and the clutch rearward tooth 23c1 via the large-depth tooth groove 23d1 and the short tooth 26b1 is fully engaged with the clutch rearward tooth 23c1 via the small-depth tooth groove 23e1. Consequently, the sleeve 26 rotates in synchronization with the first clutch ring 23 and thus the shifting operation is completed.

Figure 12:
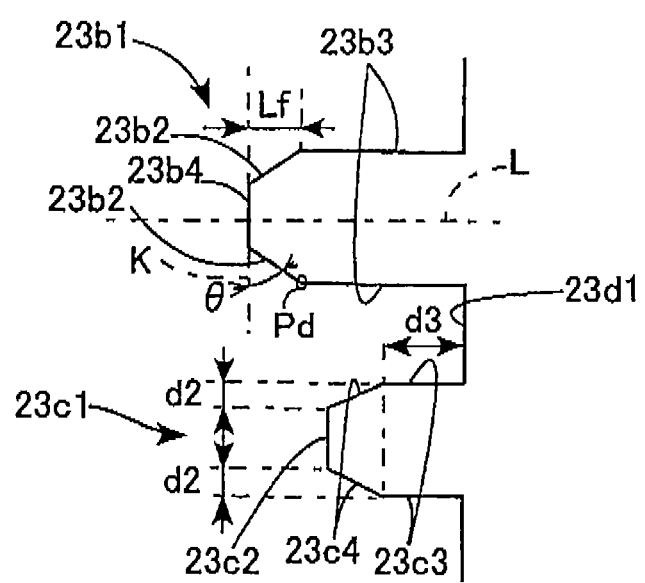
FIG. 12 is an explanatory view illustrating profiles and positions of the clutch forward and rearward teeth of the dog clutch according to a second embodiment disclosed here.

A second embodiment of the disclosure will be described as follows. The dog clutch according to the second embodiment is shown in FIG. 12. In FIG. 12, portions identical to those in FIG. 7 are designated by the same numbers in FIG. 7 and thus explanations thereof will be omitted. Different points of the second embodiment from the first embodiment will be explained below.

As illustrated in FIG. 12, according to the dog clutch of the second embodiment, the clutch forward tooth 23b1 includes the front end portion which faces the high tooth 26a1 and which forms the engagement portion 23b4 contactable with the high tooth 26a1. The engagement portion 23b4 is formed into a flat surface. The clutch forward tooth 23b1 includes the inclined surfaces 23b2 each of which is formed to extend from the engagement portion 23b4 toward the both sides in the circumferential direction of the first clutch ring 23 and to be inclined toward the rear end position Pe. Likewise in the first embodiment, the high tooth 26a1 of the sleeve 26 is pressed to the inclined surface 23b2 of the clutch forward tooth 23b1, thereby reducing the rotational difference between the high tooth 26a1 (the sleeve 26) and the inclined surface 23b2 (the first clutch ring 23). As a result, the high tooth 26a1 is easily inserted or pressed between the clutch forward teeth 23b1, therefore effectively realizing a condition where the sleeve 26 engaged with the clutch hub 25 and rotating at a different speed relative to the first clutch ring 23 is brought into synchronized rotation with the first clutch ring 23.

As described above, the engagement portion 23b4 of the front end portion of the clutch forward tooth 23b1 is formed to include the flat surface. Therefore, in a case where the front end surface 26a2 of the high tooth 26a1 is brought into contact with the engagement portion 23b4 of the clutch forward tooth 23b1, the rotational difference between the high tooth 26a1 (the sleeve 26) and the engagement portion 23b4 (the first clutch ring 23) may be finely adjusted by friction generated by such contact between the high tooth 26a1 of the sleeve 26 and the engagement portion 23b4 of the clutch forward tooth 23b1. In other words, the rotational difference between the sleeve 26 and the first clutch ring 23 may be finely adjusted so that the high tooth 26*a*1 of the sleeve 26 is easily inserted and pressed between the clutch forward teeth 23*b*1.

As described above, according to the aforementioned first and second embodiments, the dog clutch for the automated transmission 13 includes: the rotary shaft 22 rotatably connecting to one of the input shaft 22 and the output shaft 28 of the automated transmission 13 and provided rotatably about the axial line; the first and second clutch rings 23, 24 rotatably supported by the rotary shaft 22 and rotatably connecting to the other of the input shaft 22 and the output shaft 28; the clutch hub 25 fixed to the rotary shaft 22 and arranged adjacent to the first and second clutch rings 23, 24; the sleeve 26 slidably engaging with the clutch hub 25 in the direction of the axial line, the sleeve 26 including the spline 26*a*, the spline 26*a* including the plural high teeth 26*a*1 and the plural short teeth 26*b*1, each of the high teeth 26*a*1 including the whole depth which is greater than the whole depth of each of the short teeth 26*b*1; the axial driving mechanism 27 moving the sleeve 26 in the direction of the axial line; and the first and second dog clutch portions 23*a*, 24*a* arranged at the first and second clutch rings 23, 24 in a protruding manner toward the sleeve 26, the first and second dog clutch portions 23*a*, 24*a* selectively engaging and disengaging relative to the spline 26*a* formed at the sleeve 26 when the sleeve 26 moves in the direction of the axial line, the first dog clutch portion 23*a*: including the clutch forward teeth 23*b*1 each outer diameter of which is greater than the inner diameter of the high tooth 26*a*1 and which is smaller than the inner diameter of the short tooth 26*b*1, the clutch forward teeth 23*b*1 the number of which is equal to the number of high teeth 26*a*1, each of the clutch forward teeth 23*b*1 being formed to extend from the front end surface 23*a*2 of the first dog clutch portion 23*a* to the rear end position Pe of the first dog clutch portion 23*a* in a state where the clutch forward tooth 23*b*1 is provided at the position facing the high tooth 26*a*1, the clutch forward tooth 23*b*1 including the front end portion which faces the high tooth 26*a*1 and at which the engagement portion 23*b*4 contactable with the high tooth 26*a*1 is formed, and the inclined surfaces 23*b*2 which are formed to extend from the engagement portion 23*b*4 toward the both sides in the circumferential direction of the first clutch ring 23 and to be inclined toward the rear end position Pe; the clutch rearward tooth portion engageable with the short teeth 26*b*1 of the spline 26*a* and including the clutch rearward teeth 23*c*1 and the small-depth tooth grooves 23*e*1, the clutch rearward tooth portion being formed to extend from the position rearward from the front end surface 23*a*2 by the first predetermined distance d1 to the rear end position Pe; the large-depth tooth grooves 23*d*1 each formed between the clutch forward tooth 23*b*1 and one of the clutch rearward teeth 23*c*1 adjacent to the clutch forward tooth 23*b*1 and each engageable with the high tooth 26*a*1; and the contact surface 23*e*2 which is formed radially inward from the bottom surface of the small-depth tooth grooves 23*e*1 and with which the high tooth 26*a*1 is contactable.

According to the aforementioned configuration of the dog clutch, the clutch forward tooth 23*b*1 includes the front end portion which faces the high tooth 26*a*1 and at which the engagement portion 23*b*4 contactable with the high tooth 26*a*1 is formed, and the inclined surfaces 2362 extending from the engagement portion 23*b*4 toward the both sides in the circumferential direction of the first clutch ring 23 and being inclined toward the rear end position Pe. Therefore, the rotational difference between the sleeve 26 and the first clutch ring 23 may be adjusted by friction generated by the contact between the high tooth 26*a*1 of the sleeve 26 and the engagement portion 23*b*4 of the clutch forward tooth 23*b*1. In addition, the high tooth 26*a*1 is pressed against the inclined surface 23*b*2 of the clutch forward tooth 23*b*1, therefore reducing the rotational difference between the sleeve 26 and the first clutch ring 23. Consequently, the high tooth 26*a*1 easily shifts to be inserted between the clutch forward teeth 23*b*1, thereby effectively obtaining a condition where the sleeve 26 engaged with the clutch hub 25 and rotating at a different speed relative to the first clutch ring 23 is brought into synchronized rotation with the first clutch ring 23.

According to the first embodiment, the engagement portion 23*b*4 is the intersection portion at which the inclined surfaces 23*b*2 intersect with each other.

According to the aforementioned configuration of the dog clutch, the clutch forward tooth 23*b*1 includes the engagement portion 23*b*4 which is positioned at the front end portion facing the high tooth 26*a*1 and which is contactable with the high tooth 26*a*1. The engagement portion 23*b*4 is the intersection portion which the inclined surfaces 23*b*2 intersect with each other; thereby, the high tooth 26*a*1 may be easily guided toward the inclined surfaces 23*b*2 and the inclined surfaces 23*b*2 may be effectively utilized.

According to the second embodiment, the engagement portion 23*b*4 is formed into the flat surface.

According to the aforementioned configuration of the dog clutch, the clutch forward tooth 23*b*1 includes the engagement portion 23*b*4 which is at the front end portion facing the high tooth 26*a*1 and which is contactable with the high tooth 26*a*1. The engagement portion 23*b*4 is formed into the flat surface. Accordingly, for example, in a case where the high tooth 26*a*1 is brought in contact with the engagement portion 23*b*4 of the clutch forward tooth 23*b*1, the rotational difference between the sleeve 26 and the first clutch ring 23 may be finely adjusted by the friction generated by the contact between the high tooth 26*a*1 of the sleeve 26 and the engagement portion 23*b*4 of the clutch forward tooth 23*b*1. In other words, the rotational difference between the sleeve 26 and the first clutch ring 23 may be easily adjusted so that the high tooth 26*a*1 of the sleeve 26 is easily inserted and pressed between the clutch forward teeth 23*b*1.

According to the first embodiment, the position Pc at which each of the inclined surfaces 23*b*2 intersects with each of the side surfaces 23*b*3 of the clutch forward tooth 23*b*1 is closer to the front end surface 23*a*2 than the contact surface 23*e*2.

According to the aforementioned configuration of the dog clutch, the synchronized rotation between the first clutch ring 23 and the sleeve 26 that rotates at the different speed relative to the first clutch ring 23 may be selectively adjusted depending on the position Pc at which the inclined surface 23*b*2 of the clutch forward tooth 23*b*1 intersects with the side surface 23*b*3 of the clutch forward tooth 23*b*1.

According to the first embodiment, each of the clutch rearward teeth 23*c*1 of the clutch rearward tooth portion includes the engagement surface 23*c*2 contactable with the high tooth 26*a*1, the side surfaces 23*c*3, and the side inclined surfaces 23*c*4. The engagement surface 23*c*2 is formed to extend between the positions inward from each of the side surfaces 23*c*3 in the circumferential direction by the second predetermined distance d2. Each of the side inclined surfaces 23*c*4 is formed at the side surface 23*c*3 to extend from each of the side ends of the engagement surface 23*c*2 in the circumferential direction to the position forward from the rear end position Pe by the third predetermined distance d3 in the direction of the axial line.

According to the aforementioned configuration of the dog clutch, the synchronized rotation between the first clutch ring 23 and the sleeve 26 that rotates at the different speed relative to the first clutch ring 23 may be obtained by the friction generated by the contact between the high tooth 26a1 of the sleeve 26 and the engagement portion 23b4 of the clutch forward tooth 23b1, in such a way that the high tooth 26a1 is easily inserted and pressed into the large-depth tooth groove 23d1 formed between the clutch forward tooth 23b1 and the clutch rearward tooth 23c1. Further, the high tooth 26a1 of the sleeve 26 may be guided to be pressed into the large-depth tooth groove 23d1 by the side inclined surface 23c4 of the clutch rearward tooth 23c1. Furthermore, the short tooth 26b1 of the sleeve 26 may be easily guided to be inserted into the small-depth tooth groove 23e1 by the side inclined surface 23c4 of the clutch rearward tooth 23c1.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A dog clutch for an automated transmission, comprising:
a rotary shaft rotatably connecting to one of an input shaft and an output shaft of the automated transmission and provided rotatably about an axial line;
a clutch ring rotatably supported by the rotary shaft and rotatably connecting to the other of the input shaft and the output shaft;
a clutch hub fixed to the rotary shaft and arranged adjacent to the clutch ring;
a sleeve slidably engaging with the clutch hub in a direction of the axial line, the sleeve including a spline, the spline including a plurality of first teeth and a plurality of second teeth, each of the first teeth including a whole depth which is greater than a whole depth of each of the second teeth;
an axial driving device moving the sleeve in the direction of the axial line; and
a dog clutch portion arranged at the clutch ring in a protruding manner toward the sleeve, the dog clutch portion selectively engaging and disengaging relative to the spline formed at the sleeve when the sleeve moves in the direction of the axial line,
the dog clutch portion comprising:
clutch forward teeth each outer diameter of which is greater than an inner diameter of a first tooth among the first teeth and which is smaller than an inner diameter of a second tooth among the second teeth, the clutch forward teeth the number of which is equal to the number of first teeth, each of the clutch forward teeth being formed to extend from a front end surface of the dog clutch portion to a rear end position of the dog clutch portion in a state where a clutch forward tooth among the clutch forward teeth is provided at a position facing the first tooth, the clutch forward tooth including a front end portion which faces the first tooth and at which an engagement portion contactable with the first tooth is formed, and inclined surfaces which are formed to extend from the engagement portion toward both sides in a circumferential direction of the clutch ring and to be inclined toward the rear end position;
a clutch rearward tooth portion engageable with the second teeth of the spline and including clutch rearward teeth and a small-depth tooth groove, the clutch rearward tooth portion being formed to extend from a position rearward from the front end surface by a first predetermined distance to the rear end position;
a large-depth tooth groove which is formed between the clutch forward tooth and one of the clutch rearward teeth adjacent to the clutch forward tooth and with which the first tooth is engageable; and
a contact surface which is formed at a radially inward side from a bottom surface of the small-depth tooth groove and with which the first tooth is contactable, wherein
each of the clutch rearward teeth of the clutch rearward tooth portion includes an engagement surface contactable with the first tooth, side surfaces, and first side inclined surfaces,
the engagement surface being formed to extend between positions inward from each of the side surfaces of the clutch rearward teeth in the circumferential direction by a second predetermined distance,
each of the first side inclined surfaces being formed at one of the side surfaces of the clutch rearward teeth to extend from each of side ends of the engagement surface in the circumferential direction to a position forward from the rear end position by a third predetermined distance in the direction of the axial line,
the clutch rearward tooth portion includes the contact surface, side surfaces, and second side inclined surfaces,
the contact surface being formed to extend between positions inward from each of the side surfaces of the clutch rearward tooth portion in the circumferential direction by the second predetermined distance,
each of the second side inclined surfaces being formed at one of the side surfaces of the clutch rearward tooth portion to extend from each of side ends of the contact surface in the circumferential direction to a position forward from the rear end position by the third predetermined distance in the direction of the axial line, and
the second side inclined surfaces are provided at a position facing side surfaces of the clutch forward tooth.

2. The dog clutch to claim 1, wherein the engagement portion is an intersection portion at which the inclined surfaces intersect with each other.

3. The dog clutch according to claim 1, wherein the engagement portion is formed into a flat surface.

4. The dog clutch to according to claim 1, wherein a position at which each of the inclined surfaces intersects with each of side surfaces of the clutch forward tooth is closer to the front end surface than the contact surface.

* * * * *